United States Patent [19]

Philpot

[11] Patent Number: 4,709,573

[45] Date of Patent: Dec. 1, 1987

[54] SURFACE HEATING ELEMENT SUPPORT SPIDER

[75] Inventor: James E. Philpot, Cookeville, Tenn.

[73] Assignee: Teledyne Industries Inc., Cookeville, Tenn.

[21] Appl. No.: 901,615

[22] Filed: Aug. 29, 1986

[51] Int. Cl.[4] .................... B21C 37/02; B23P 13/00

[52] U.S. Cl. .................... 72/379; 29/150; 29/400 M; 29/400 D; 72/337; 219/458

[58] Field of Search .................... 29/150, 11, 18, 400 M, 29/400 D, 428; 72/336, 337, 379; 219/458, 463, 464, 455

[56] References Cited

U.S. PATENT DOCUMENTS

| | | | |
|---|---|---|---|
| 143,656 | 10/1873 | Barney | 29/150 |
| 2,271,977 | 2/1942 | Hjelmgren | 219/455 X |
| 2,877,334 | 3/1959 | McOrlly et al. | 219/463 |
| 3,067,506 | 12/1962 | Grant et al. | 72/379 X |
| 3,072,775 | 1/1963 | Ammerman et al. | 219/455 X |
| 3,133,181 | 5/1964 | Hanson | 219/458 X |
| 3,162,755 | 12/1964 | Hanson | 219/458 X |
| 3,192,361 | 6/1965 | Post et al. | 219/461 X |
| 3,586,826 | 6/1971 | Dills | 219/461 X |
| 3,749,883 | 7/1973 | Vodvarka et al. | 219/460 X |
| 4,189,633 | 2/1980 | Skinner | 219/458 |

*Primary Examiner*—Howard N. Goldberg
*Assistant Examiner*—Ronald S. Wallace
*Attorney, Agent, or Firm*—Dennison, Meserole, Pollack & Scheiner

[57] ABSTRACT

A support spider for a surface heating element is formed from a single piece of sheet material by first cutting a blank defining three legs. Two of the legs extend oppositely along a common longitudinal extent, while the third leg extends parallel to one of the first and second legs and is connected thereto by a web of material forming an integral hinge. The third leg is first folded about the integral hinge so as to be substantially adjacent to, overlying, and coextensive with one of the first and second legs, and the two adjacent legs then spread apart so that a symmetrical three-leg spider is formed.

3 Claims, 12 Drawing Figures

SURFACE HEATING ELEMENT SUPPORT SPIDER

BACKGROUND OF THE INVENTION

1. Field of the Invention

This invention relates generally to surface electric heating element assemblies, and more particularly to a support spider for a surface heating element.

2. Description of the Prior Art

Surface electric heating elements, such as those used with electric range units and the like, require a support element for retaining in place the heating coil. Typically, these heating elements support members, or spiders, are constructed in a three-leg configuration. One approach is to employ three separate elements suitably fastened together to construct the spider. Examples of such construction can be found in U.S. Pat. Nos. 3,072,775, issued Jan. 8, 1963, to G. E. Ammerman et al, and 4,189,633, issued Feb. 19, 1980, to C. A. Skinner.

Various proposals have been made for simplifying assembly of the three-leg support spiders by constructing the spiders from only two elements. Examples of such constructions can be found in U.S. Pat. Nos. 2,271,977, issued Feb. 3, 1942, to C. I. Hjelmgren, and 3,192,361, issued June 29, 1965, to R. L. Post et al. U.S. Pat. No. 2,271,977, forms two legs from a single blank by connecting the legs together in the base area thereof by a web of material, folding the material so as to place the legs in overlying relation, and bending the legs apart to a desired angle, such as 120°. The base area of the legs form a socket for receiving a third leg. While an improvement on three-piece constructions, these two-piece constructions still require assembly of pieces in addition to folding and/or bending of the various pieces.

It has been proposed to construct surface heating element support spiders from a single piece of material. For example. U.S. Pat. No. 3,586,826, issued June 22, 1971, to R. L. Dills, discloses a removable support for a surface heating unit which is stamped from a sheet of planar material and used as stamped, without any bending and/or folding. Even with the provis ion of reinforcing ribs in the stamping, however, this mode of construction suffers from strength problems, and perhaps more importantly, is very wasteful of material.

Another proposal for a single piece support spider is found in U.S. Pat. No. 3,749.883, issued July 31, 1973, to R. T. Vodvarka et al. This device is constructed from a strip of metal bent substantially in the form of a V. Such a configuration, however, is not as desirable as the standard three-leg spider.

U.S. Pat. Nos. 2,877,334, issued Mar. 10, 1959, to J. C. McOrlly et al, and 3,336,466, issued Aug. 15, 1967, to D. M. Cunningham, disclose one-piece spiders for electric heating elements wherein the spider has a generally triangular-shaped loop with a leg formed by extensions of the material from an apex of the triangular loop. The apex of the triangular-shaped loop, however, is not at the center of the associated heating element, a rather undesirable feature inasmuch as it is the symmetrical arrangement of the typical three-leg spider relative to an associated heating element that makes the three-leg spider so popular. Further, the loop-arrangement wastes material by joining together the outer ends of two of the legs of the spider, and creates problems with control of dimensions of the support member.

SUMMARY OF THE INVENTION

It is an object of the present invention to provide a surface heating element support spider which is made in one-piece in a simple yet efficient and accurate manner.

It is another object of the present invention to provide a surface heating element support spider which will substantially reduce assembly labor requirements when compared to two and three-piece spiders, and will make more efficient use of material.

A still further object of the present invention is to provide a one-piece surface heating element support spider which will have more closely controlled dimensions when compared to support spiders constructed according to other techniques.

These and other objects of the present invention are achieved by providing a support spider comprising a first leg and a second leg integral with one another, and a third leg joined with one of the first leg and the second leg by an integral hinge. Each of the first leg, second leg, and third leg are disposed in a common plane and are spaced equidistant from one another.

A support spider according to the present invention is constructed from a single blank stamped or otherwise cut from a sheet of suitable material, such as aluminum, steel, or other suitable metal. The first leg and the second leg are arranged extending colinearly in opposite directions, with the third leg being spaced from and extending substantially parallel to one of the first leg and the second leg and connected to a base area of one of the first leg and the second leg by a web of material. Once stamped from a sheet of material, the third leg is folded about the first and second legs and into a plane spaced from, overlying, and substantially coextensive with one of the first leg and the second leg. Once folded, two of the three legs can be bent from a point adjacent the web of material connecting the third leg to the other legs, and spread to a suitable angle, such as 120°, to form the finished support spider.

Each length according to the present invention is cut with lugs provided on at least one of the legs forming the blank to be used for retaining a conventional heating element on the finished support spider. Differences in the configuration of the blanks used for constructing support spiders in accordance with the present invention primarily vary as to which leg of the blank is provided with the heating element retaining lugs.

The leg of the blank, and therefore the finished support spider, which is provided with the heating element retaining lugs has an end portion provided with a sloping face in a conventional manner, intended for permitting the spider to be properly disposed on a conventional range unit and the like.

DESCRIPTION OF THE PREFERRED EMBODIMENTS

Figure 1:
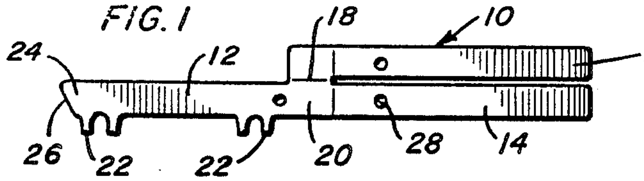
FIG. 1 is a diagrammatic, plan view showing a blank configured in accordance with a first embodiment of a support spider according to the present invention.

Referring now more particularly to FIG. 1 of the drawings, a blank 10 for making a support spider according to the present invention is cut from a planar sheet (not shown) of suitable material, such as aluminum, steel, and the like, and comprises first and second legs 12 and 14 oppositely directed along a common extent, and a third leg 16 spaced from and extending substantially parallel to one of the first and second legs 12, 14. Leg 16 is connected as by a web 18 of material to a base area 20 of one of the first and second legs 12, 14. In the illustrated embodiment, leg 16 is attached to the base area of the first leg 12.

One or more sets of lugs 22 are provided along the extent of one of the legs, in this case the first leg 12, for retaining a conventional surface heating element (not shown) in a manner well known per se. The leg provided with the lugs 22, here leg 12, includes an end portion 24 defining a sloping face 26 for permitting the spider formed from the blank 10 to be properly arranged on a conventional range unit (not shown), and the like, in a conventional manner.

Provided in each of the legs 2, 14, and 16 of blank 10 is an aperture 28. As will be appreciated from the discussion below, a finished spider constructed from a blank 10 according to the present invention will arrange the apertures 28 in such a manner as to receive a conventional medallion (not shown) and the like commonly placed on such support spiders to identify a manufacturer of an associated stove or other heating unit.

Figure 2:
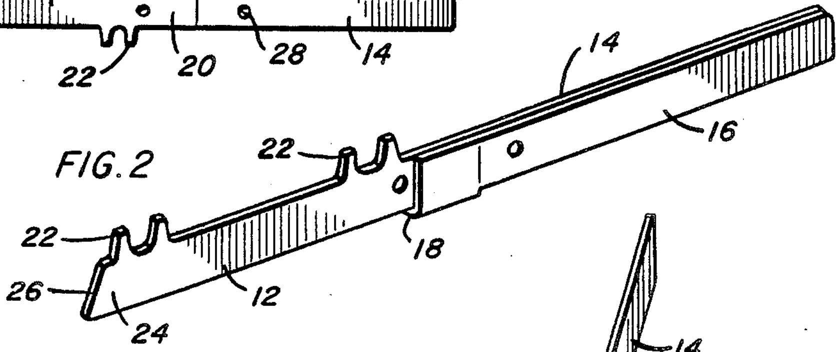
FIG. 2 is a perspective view showing the blank of FIG. 1 folded over on itself as an intermediate step in fabricating a support spider according to the present invention.
Figure 3:
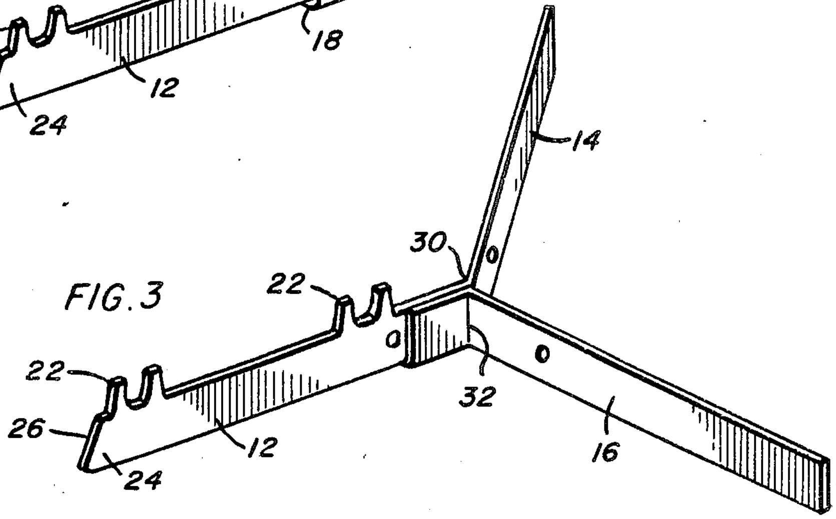
FIG. 3 is a perspective view showing the support spider of FIGS. 1 and 2 in its final configuration with the previously adjacent legs thereof spread apart a suitable distance for forming a generally symmetrical element.

As can be seen from FIGS. 2 and 3 of the drawings, a support spider for a surface heating unit is formed from blank 10 by first folding the third leg 16 about the first and second legs 12 and 14 using the web 18 as an integral hinge. Leg 16 is pivoted in this manner into a plane spaced from, overlying, and substantially coextensive with the second leg 14, in this instance. Now, the two legs immediately adjacent one another, specifically legs 14 and 16, can be spread, for example, 120° about the bend lines 30 and 32, respectively, so that the legs 12, 14 and 16 are substantially equidistant from one another so as to form the symmetrical spider seen in FIG. 3 with all three legs 12, 14 and 16 disposed in a common plane.

Figure 4:
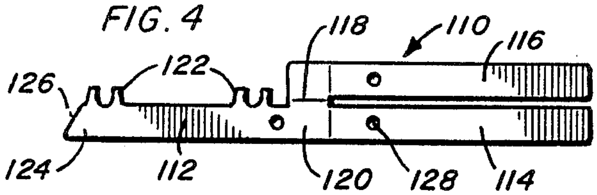
FIG. 4 is a diagrammatic, plan view similar to FIG. 1, but showing a second embodiment of a support spider according to the present invention.

FIG. 4 illustrates a blank 110 forming a second embodiment of the present invention, and including legs 112, 114, and 116 in a manner similar to that of blank 10. The offset leg 116 is connected as by a web 118 of material to a base area 120 of leg 112. The principal difference between blank 110 and blank 10 is the arrangement of lugs 122, similar to lugs 22, extending away from leg 112 in a direction that the leg 116 is spaced from the legs 112 and 114. Like leg 12, leg 112 has an end portion 124 provided with a sloping face 126, and each of the legs 112, 114, and 116, is provided with an aperture 128 similar in arrangement and function to apertures 28.

Figure 5:
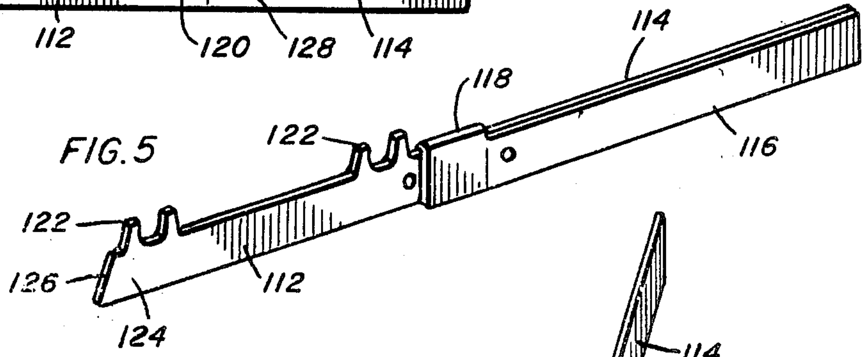
FIG. 5 is a perspective view similar to FIG. 2, but showing the blank illustrated in FIG. 4 folded on itself.
Figure 6:
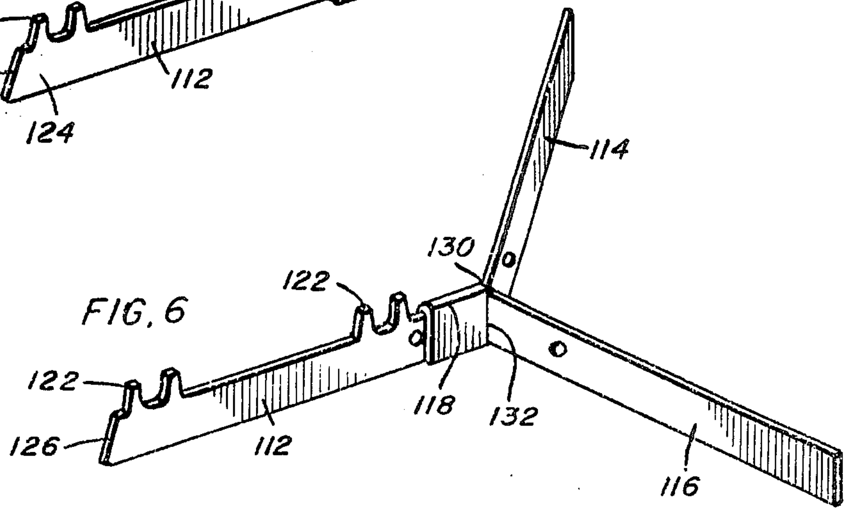
FIG. 6 is a perspective view similar to FIG. 3, but showing the support spider of FIGS. 4 and 5 in the final configuration thereof.

As can be seen from FIGS. 5 and 6, leg 116 is first folded about the integral hinge formed by the web 118 into the position seen in FIG. 5. Subsequently, the legs 114 and 116 are spread apart from one another along the bend lines 130 and 132 to form a spider seen in FIG. 6.

Figure 7:
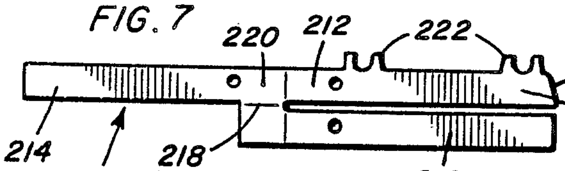
FIG. 7 is a diagrammatic, plan view similar to FIGS. 1 and 4, but showing a third embodiment of a support spider according to the present invention.

A third embodiment of a blank according to the present invention, designated 210, is seen in FIG. 7 of the drawings. Comparison of blank 210 with blanks 10 and 110 will reveal that the relationship of the first and second legs 212 and 214 with respect to a third leg 216 is reversed from the legs of blanks 10 and 110, as though the latter blanks had been turned over. Closer inspection, however, will reveal that the third leg 216 is connected by a web 218 of material to a base area 220 of the second leg 214, rather than the first leg 212. This results in the third leg 216 being coextensive with the first leg 212, rather than the second leg 214. Lugs 222 are provided on leg 212 so as to extend away from the third leg 216, with the first leg 212 terminating in an end portion 224 having a sloping face 226, as illustrated.

A plurality of apertures 228 are arranged in a similar manner to apertures 28 and 128, and are intended to serve the same function as the aforementioned apertures.

Figure 8:
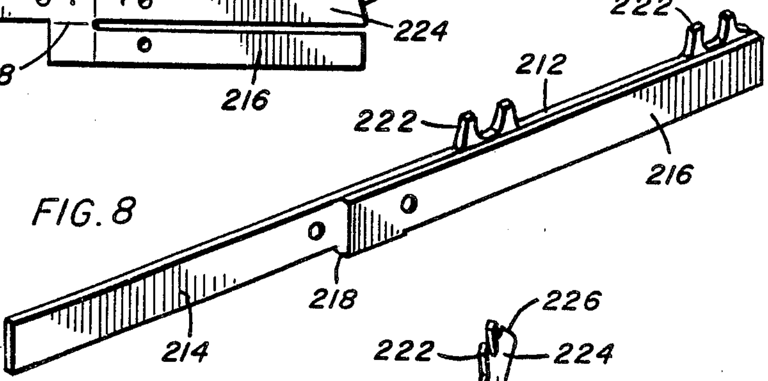
FIG. 8 is a perspective view similar to FIGS. 2 an 5, but illustrating the blank according to FIG. 7 in a folded mode thereof.
Figure 9:
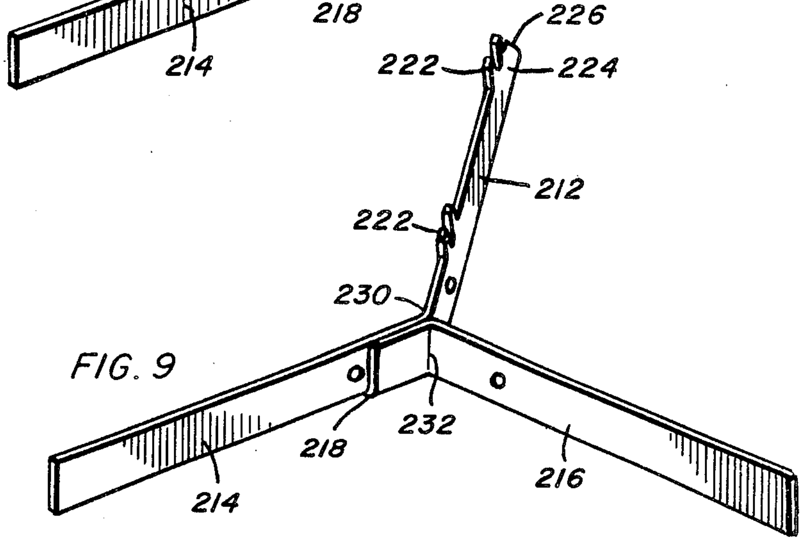
FIG. 9 is a perspective view similar to FIGS. 3 and 6, but showing the final configuration of the support spider of FIGS. 7 and 8.

Blank 210 is formed into a spider by first folding upwardly the third leg 216 about the integral hinge formed by web 218 of material, as seen in FIG. 8. Subsequently, the legs 212 and 216, the first and third legs in this embodiment, can be spread about the respective bend lines 230 and 232 so as to form the symmetrical spider illustrated in FIG. 9.

Figure 10:
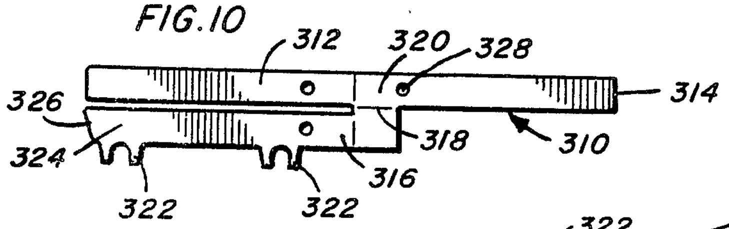
FIG. 10 is a diagrammatic, plan view, similar to FIGS. 1, 4, and 7, but showing a fourth embodiment of a blank for a support spider according to the present invention.

Yet another embodiment of the present invention is seen in FIG. 10, wherein a blank 310 forms a first leg 312, an oppositely directed second leg 314, and a third leg 316 offset from the legs 312 and 314, and connected by a web 318 of material to a base area 320 of the second leg 314. This embodiment differs significantly from the three embodiments described above in that lugs 322 are provided on the third leg 316, and are arranged extending away from leg 316 as well as the legs 312 and 314. Leg 316 terminates in an end portion 324 provided with the usual sloping face 326.

Each of the legs 312, 314, and 316 is provided with a respective aperture 328 which functions in a like manner to the apertures described above.

Figure 11:
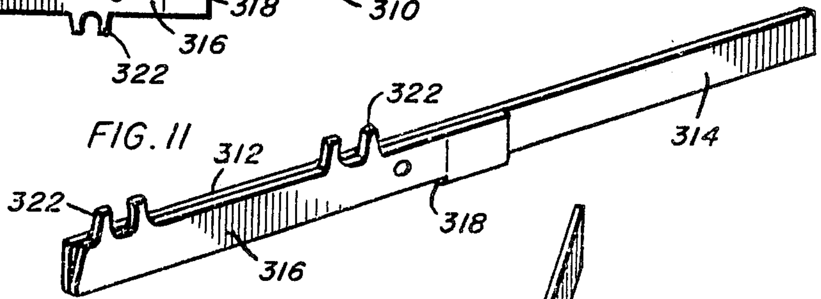
FIG. 11 is a perspective view similar to FIGS. 2, 5, and 8, but illustrating the blank of FIG. 10 in a folded mode.
Figure 12:
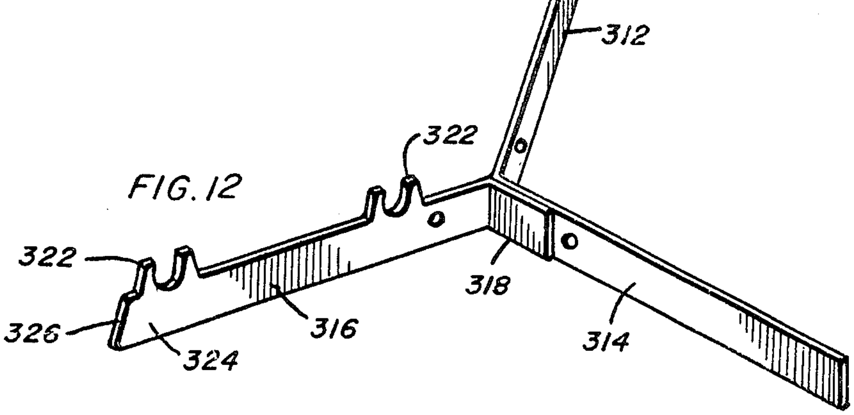
FIG. 12 is a perspective view similar to FIGS. 3, 6, 9, and 12, but showing the final configuration of the embodiment of the present invention fabricated from a blank as illustrated in FIG. 10.

A support spider according to the present invention is formed from blank 310 by first folding lug 316 about the integral hinge formed by web 318 to the position seen in FIG. 11, and subsequently spreading legs 312 and 316 apart about the bend lines 330 and 332 to obtain the symmetrical configuration as seen in FIG. 12.

As can be seen from the above description and from the drawings, a support spider according to the present invention for a surface heating element can be constructed in a simple and convenient manner, from a single piece of material with little waste to a sheet of material, and without the necessity of fastening elements and the like. It will be appreciated that the folding and spreading steps in fabricating a support spider from a blank according to the invention could be accomplished by machinery, without the necessity of manual assembly.

What is claimed is:

1. A method of making a support spider for a surface heating element utilizing a blank comprising first and second oppositely directed legs and a third leg spaced from and extending substantially parallel to one of the first and second legs and connected to a base area of one of the first and second legs, said method comprising the steps of;

(a) folding the third leg about the first and second legs and into a plane spaced from, overlying, and substantially coextensive with an adjacent one of the first and second legs; and (b) spreading the third leg and the one of the first and second legs adjacent thereto from one another for arranging the first and second legs and the third leg substantially equidistant from one another.

2. A method of making a support spider for a surface heating element comprising the steps of:

(a) forming from a single piece of material a blank comprising first and second oppositely directed legs and a third leg spaced from and extending substantially parallel to one of the first and second legs and connected to a base area of one of the first and second legs;

(b) folding the third leg about the first and second legs and into a plane spaced from, overlying, and substantially coextensive with an adjacent one of the first and second legs; and (c) spreading the third leg and the one of the first and second legs adjacent thereto from one another for arranging the first and second legs and the third leg substantially equidistant from one another.

3. A method as set forth in claim 2, wherein the step of forming a blank includes the step of providing heating element retaining lugs on one of the first and second legs and the third leg.

* * * * *